United States Patent [19]
Schwab

[11] 4,432,604
[45] Feb. 21, 1984

[54] SELF-ADJUSTING FIBEROPTIC CONNECTOR ASSEMBLY

[75] Inventor: Richard E. Schwab, Randolph, N.J.

[73] Assignee: Bell Telephone Laboratories, Incorporated, Murray Hill, N.J.

[21] Appl. No.: 372,743

[22] Filed: Apr. 28, 1982

[51] Int. Cl.³ .................................................. G02B 7/26
[52] U.S. Cl. ................................ 350/96.21; 350/96.20
[58] Field of Search ............... 350/96.20, 96.21, 96.22; 339/17 R, 17 L, 17 LC, 17 M

[56] References Cited

U.S. PATENT DOCUMENTS

| | | | |
|---|---|---|---|
| 4,167,303 | 9/1979 | Bowen et al. | 350/96.21 |
| 4,178,068 | 12/1979 | Hoover | 350/96.21 |
| 4,198,122 | 4/1980 | Prunier et al. | 350/96.21 |
| 4,217,030 | 8/1980 | Howarth | 350/96.21 |
| 4,268,114 | 5/1981 | d'Auria et al. | 350/96.20 |
| 4,387,956 | 6/1983 | Cline | 350/96.20 |

OTHER PUBLICATIONS

Cefarelli et al., "Optical Circuit Module Connector," *IBM Tech. Discl. Bull.*, vol. 21, No. 4, Sep. 1978, pp. 1568-1570.

Young et al., "Design and Performance of the Biconic Connector . . . ," *Proc. of 30th Int. Wire & Cable Symp.* (Cherry Hill, N.J.), Nov. 1981, pp. 411-418.

*Primary Examiner*—John D. Lee
*Attorney, Agent, or Firm*—P. E. Roberts; H. L. Newman

[57] ABSTRACT

A fiber-optic electronic connector assembly provides for consistent low insertion loss operation by providing for the fiber optic connector assembly to float as a unit in three substantially orthogonal directions.

5 Claims, 6 Drawing Figures

SELF-ADJUSTING FIBEROPTIC CONNECTOR ASSEMBLY

TECHNICAL FIELD

This invention relates to optical fiber connectors and, in particular, to a self-adjusting optical fiber connector for use in conjunction with an electrical connector.

BACKGROUND OF THE INVENTION

In an article entitled "Interconnection For Lightguide Fibers" by Messrs. T. Leslie Williford, Jr. et al, published in *The Western Electric Engineer*, Volume XXIV, No. 1, Winter 1980, pages 87 to 95, there is disclosed an optical coupling device comprising a biconical sleeve for aligning the conical plugs attached to two optical fibers. When such an optical fiber connector is used in conjunction with an electrical connector, it is desirable to insure that the optical fiber connector can be assembled with the same ease as the electrical connector. Furthermore, it is also necessary to insure that the optical coupling will not require adjustment, for reducing insertion loss, with each connection.

SUMMARY OF THE INVENTION

In accordance with an illustrative embodiment of the present invention, there is disclosed a self-adjusting optical fiber connector with freedom to move in three substantially orthogonal directions.

The optical connector comprises a biconical sleeve for aligning two conical plugs, each plug terminating an optical fiber. One of the conical plugs is mounted on a bracket which is fastened to a backplane and which permits the plug to move, relative to the backplane, in one of the aforesaid orthogonal directions.

The biconical sleeve is mounted on a printed wiring circuit board having a plurality of fingers which plug into an electrical connector. The biconical sleeve is allowed to move, relative to the circuit board, in a second one of the aforesaid orthogonal directions.

The second conical plug is inserted into one end of the biconical sleeve. When the fingers of the circuit board are inserted into the electrical connector, the aforesaid first conical plug is inserted into the other end of the biconical sleeve. Because of a resilient device, such as a spring, housed within the biconical sleeve, the two conical plugs are free to move into and out of the biconical sleeve, in the third of the aforesaid orthogonal directions.

Because of the freedom of movement in the three orthogonal directions, the optical coupling is self-adjusting, thereby permitting: ease and speed in connection and disconnection; repeated connections with substantially identical low insertion loss; no requirement for adjustment with each connection; and larger tolerances, hence less expensive parts.

DETAILED DESCRIPTION

Figure 1:
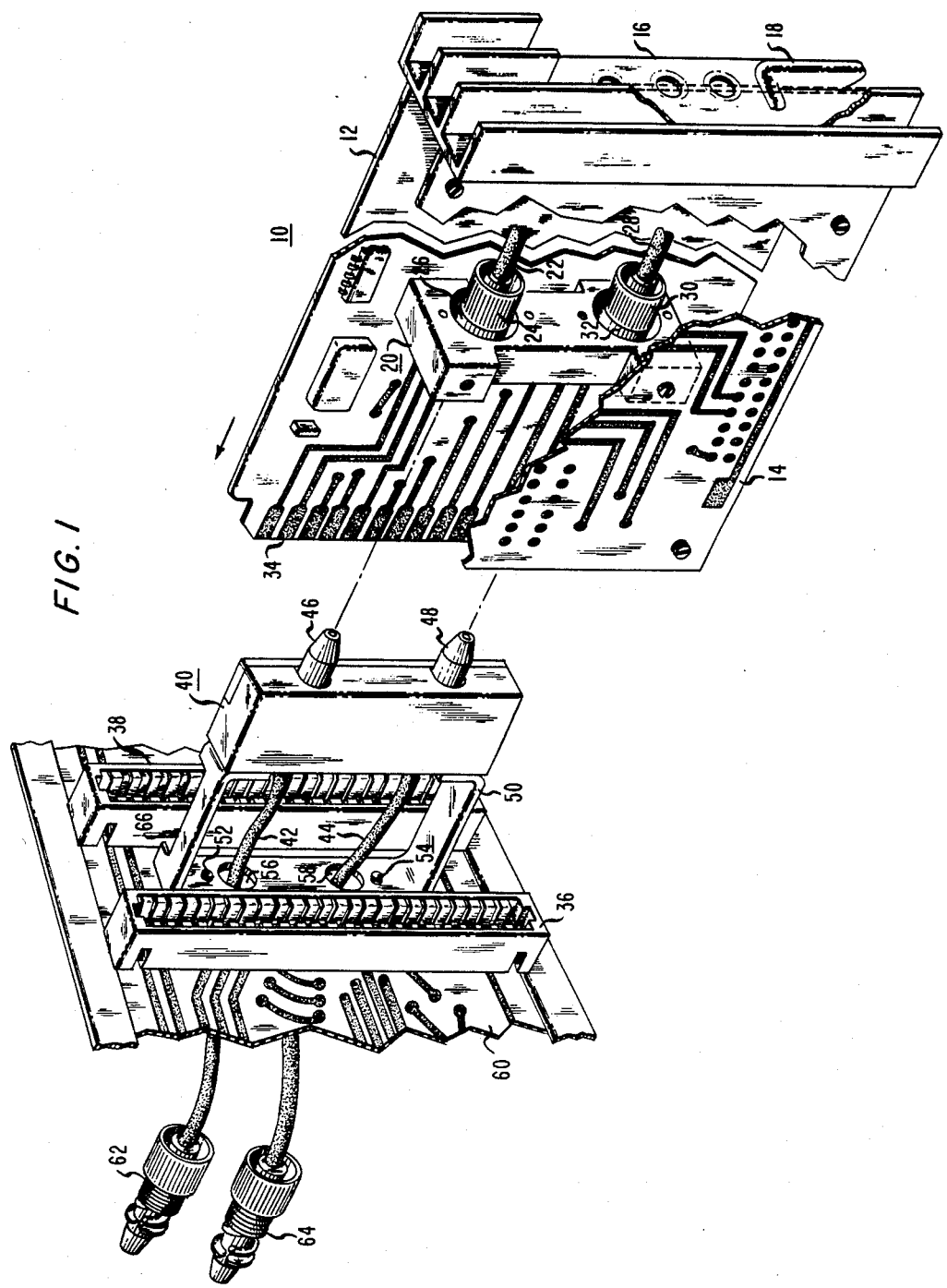
FIG. 1 shows an isometric view of the optical fiber connector.

Referring to FIG. 1, there is shown a plug-in circuit package 10. Circuit package 10 comprises printed wiring circuit boards 12 and 14, faceplate 16, lever 18 of a locking mechanism, to be described with reference to FIGS. 4, 5 and 6 hereinbelow, means 20 for fastening optical fiber aligning means 26 and 32 to circuit boards 12 and 14, and electrical fingers 34. Optical fibers 22 and 28 terminate in conical plugs 24 and 30, respectively. Conical plugs 24 and 30 are fastened to aligning means 26 and 32, respectively. Electrical signals are converted into optical signals in transducers (not shown) mounted on circuit boards 12 and 14 or faceplate 16 and the optical signals are transmitted through the optical fiber 22. Likewise, optical signals received through optical fiber 28 are converted into electrical signals in transducers (not shown) mounted on circuit boards 12 and 14 or faceplate 16.

There are also shown a plurality of receptacles 36,38 mounted on a frame (not shown) and a backplane 60 for interconnecting the pins (not shown) protruding from the rear surface of receptacles 36,38. A plurality of optical fibers 42,44 are terminated in a plurality of conical plugs 46,48, respectively. Conical plugs 46,48 are fastened by securing means 40 mounted on a bracket 50. Bracket 50 is fastened by screws 52,54 to the backplane 60. Apertures 56,58 permit optical fibers 42,44 to pass through backplane 60 and be terminated on conical plugs 62,64, respectively. Where, however, space is not available for working behind the backplane 60, such as at remote carrier terminal locations (not shown), optical fibers 42,44 may be passed through the recess 66 in bracket 50.

Electrical and optical coupling is achieved, simultaneously, when electrical fingers 34 are inserted into receptacle 38 and conical plugs 46,48 into aligning means 26,32, respectively.

Figure 2:
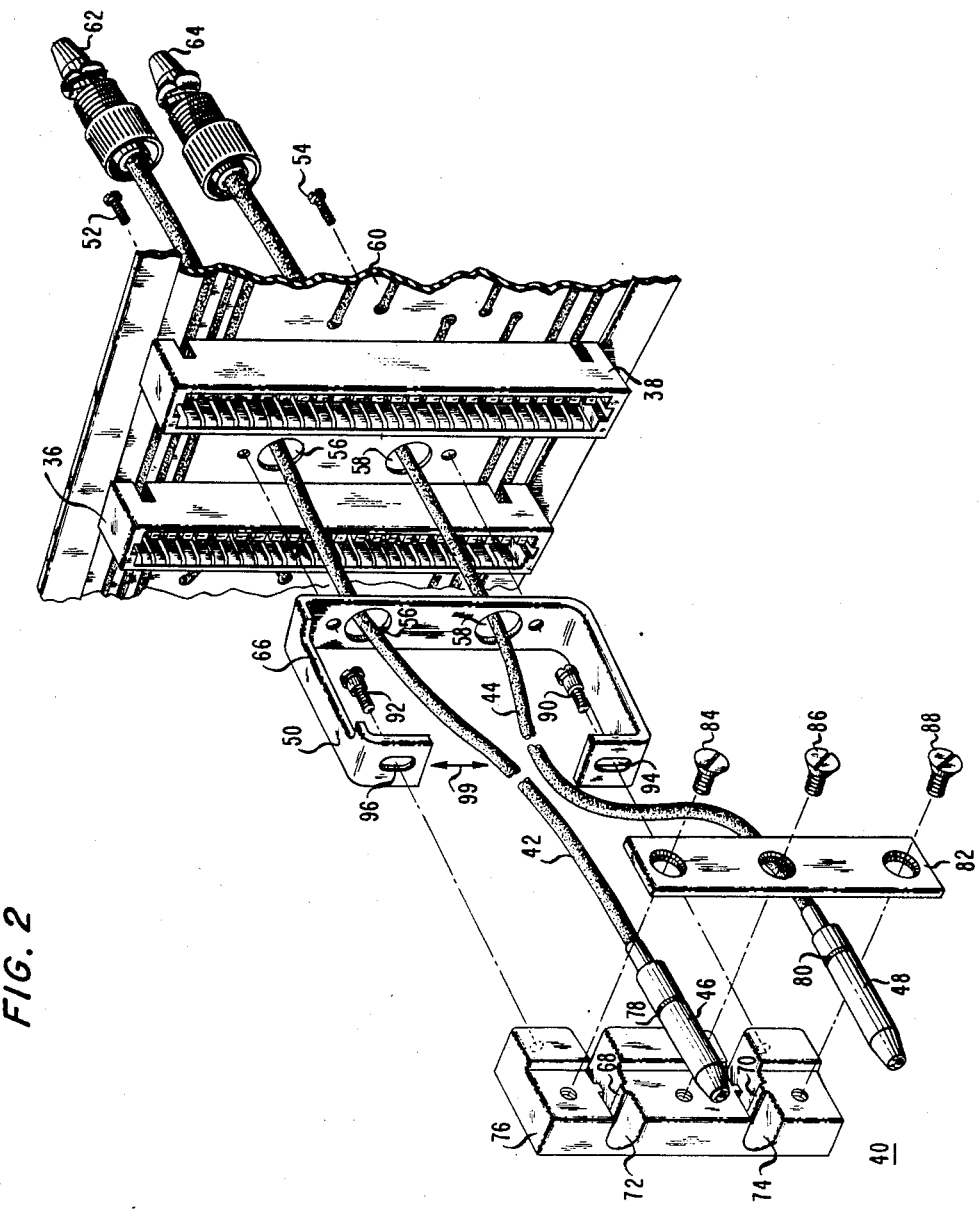
FIG. 2 shows an exploded view of a conical plug of FIG. 1.

Referring to FIG. 2, there is shown in exploded, isometric view the details of securing means 40 and bracket 50 of FIG. 1. When conical plugs 46,48 are inserted into the recesses 72,74, respectively, of block 76, the ridges 68,70 engage the annular hollow slots 78,80, respectively, of the plugs 46,48. When plate 82 is fastened to the block 76 by screws 84,86,88, the conical plugs 46,48 are securely fastened by the securing means 40. Securing means 40 is mounted on bracket 50 by shouldered screws 90,92. There are provided apertures 94,96, however, which permit the securing means 40 to move, as a unit, with respect to bracket 50, up and down in a direction shown by line 99. That is, the conical plugs 46,48 are allowed to move along the direction 99 with respect to the backplane 60, to which the bracket 50 is fastened.

Figure 3:
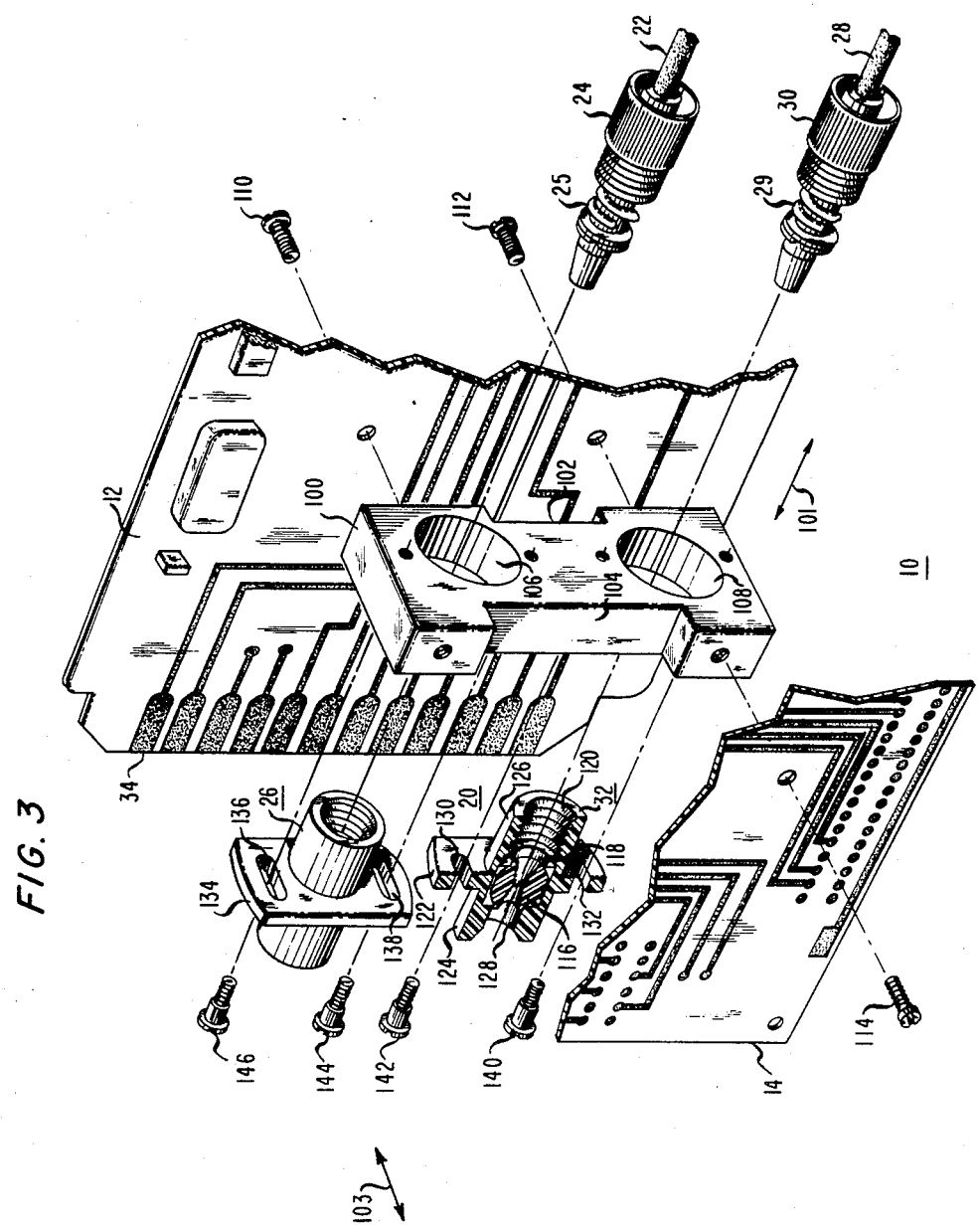
FIG. 3 shows an exploded view of the biconical sleeve of FIG. 1.

Referring to FIG. 3, there is shown in exploded, isometric view details of the fastening means 20 of FIG. 1. Referring more particularly to the aligning means 32, there is shown a flat piece 122 and sleeves 124,126 on opposite sides thereof. A cut-away section of the aligning means 32 shows a biconical piece 116 capable of movement, along the direction shown by line 101, within the aligning means 32. There is also shown a retaining ring 118, screwed into place through threads 120 along the inner surface of sleeve 126 of aligning means 32. Retaining ring 118 prevents the biconical piece 116 from falling out through the threaded end of aligning means 32. The inner surface 128 of sleeve 124 is cylindrical and smooth.

The flat piece 122 of aligning means 32 has two apertures 130 and 132. When sleeve 126 is inserted through aperture 108 of the mounting block 100, screws 140 and 142 are inserted through apertures 132 and 130, respectively, to fasten aligning means 32 to the mounting block 100. The apertures 130 and 132 are larger than the diameter of the shouldered screws 142 and 140, respectively, thereby allowing the aligning piece to move, relative to the mounting block 100, along the direction 103. Direction 99 of FIG. 2, and directions 101, 103 of FIG. 3 are all perpendicular to one another, that is, they are orthogonal directions.

Likewise, aligning means 26 is fastened to mounting block 100 by inserting screws 144 and 146 through apertures 138 and 136, respectively. Again, because apertures 136 and 138 are larger than the diameter of shouldered screws 146 and 144, the aligning means 26 is allowed to move along direction 103 with respect to the mounting block 100. Because mounting block 100 is fastened to circuit boards 12 and 14, the aligning means 26 moves along direction 103 with respect to the circuit boards 12 and 14.

After aligning means 26 and 32 are fastened to mounting block 100, plugs 24 and 30, respectively, are connected thereto. Spring 29 on plug 30 forces the biconical piece 116 to one end of its free travel in the aligning means 32. Likewise, spring 25 on plug 24 forces the biconical piece (not shown) in aligning means 26 to one end of its free travel.

As stated herein above, with reference to FIG. 1, when the electrical fingers 34 are inserted into the receptacle 38, the conical plugs 48 and 46 enter the aligning means 32 and 36, respectively. More particularly, conical plug 48 enters one end of the smooth surfaced biconical aligning piece 116, housed within the aligning means 32. Because of the freedom of movement of conical plug 48 along the aforesaid direction 99 and the freedom of movement of the aligning piece 116 along the direction 103, the conical plug 48 and the biconical aligning piece 116 will move to achieve a substantially perfect fit.

As stated earlier herein, conical plug 30 is screwed into the threaded end of the aligning means 32 so that the tapered end of conical plug 30 fits into one end of the biconical aligning piece 116. Further, the spring 29 forces the biconical aligning piece 116 to one end within the aligning means 32. Thus, when conical plug 48 is inserted into the other end of the biconical aligning piece 116, the tapered end of conical plug 48 is automatically centered so that the free ends of conical plug 48 and conical plug 30 abut each other. Because of the spring 29, the conical plugs 48 and 30 move along the aforesaid direction 101 to achieve a substantially perfect fit. Thus, because of the freedom of movement along the aforesaid directions 99, 101, and 103 a substantially perfect fit is obtained when the optical connector is assembled. Furthermore, even after assembly, the optical connector can move as a unit in any one or more of the aforesaid directions, thus damping mechanical shocks due to environmental conditions.

Figure 6:
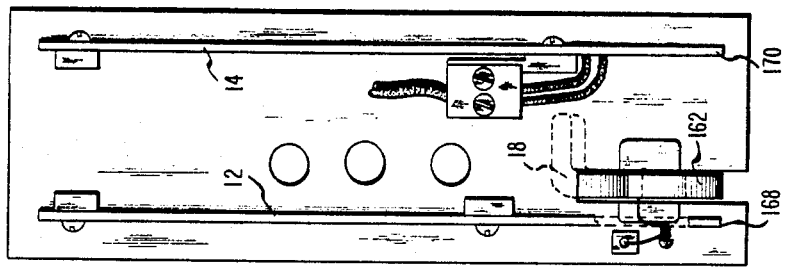
FIGS. 4, 5 and 6 show locking means for securing the optical fiber connector of FIG. 1.
Figure 5:
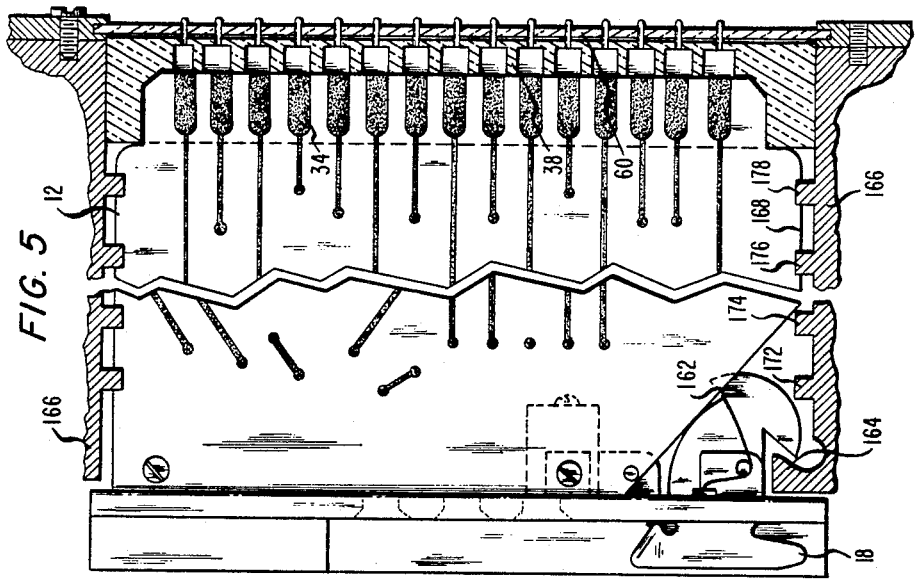
Figure 4:
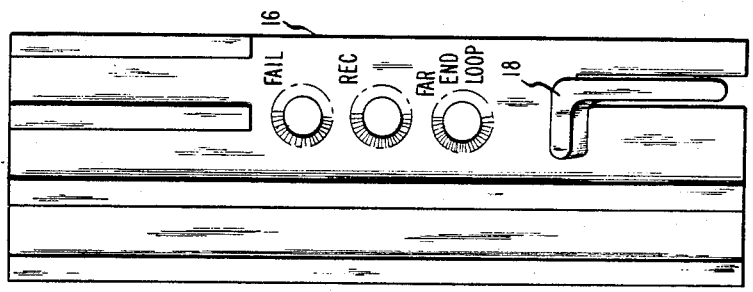

Referring to FIGS. 4, 5 and 6, there are shown three views of the circuit package 10 with particular emphasis on the locking mechanism. Referring more particularly to FIGS. 4 and 5, there is shown lever 18 for releasing pawl 162 from detent 164, thereby permitting the circuit package 10 to be unplugged from a frame 166. Referring to FIG. 6, there is shown the rear view of the faceplate 16 and the locking mechanism with pawl 162.

When circuit package 10 is inserted into the frame 166, lower edges 168,170 of circuit boards 12, 14, respectively, travel along the top surface of guides 172, 174, 176 and 178, located on the lower surface of a plug-in rack of frame 166. When circuit package 10 is fully inserted, fingers 34 enter and make contact with the receptacle 38 in the backplane 60. Simultaneously, referring briefly to FIG. 1, the plugs 46,48 enter the aligning means 26,32, respectively. Because the plugs 46,48 move freely with respect to circuit boards 12 and 14 and because the plugs 46,48 and 24,30, respectively, move freely with respect to each other, the optical coupling is self-adjusting.

Furthermore, when the aforesaid electrical and optical coupling has been achieved, pawl 162 engages detent 164, thereby securely fastening the circuit package in place in the frame 166 (shown partially). The aforesaid coupling device works well, under severe vibrations from such environments as subways, by permitting the assembled unit to move in any one or more of the aforesaid substantially orthogonal directions.

What is claimed is:

1. A self-adjusting fiberoptic connector assembly capable of movement in three substantially orthogonal directions, said connector comprising:
   first and second fiberoptic cable ends terminated in first and second plugs, respectively,
   a fiberoptic connector for aligning said first and second plugs,
   first means for securing said first plug to a backplane, said first securing means providing for movement of said first plug relative to said backplane in a first one of said orthogonal directions,
   second means for securing said fiberoptic connector to a printed circuit board, said second securing means providing for movement of said fiberoptic connector relative to said printed circuit board in a second one of said orthogonal directions, and
   resilient means on one of said first and second plugs for movement of said first and second plugs in the third one of said orthogonal directions when said first and second plugs are inserted in said fiberoptic connector for alignment.

2. A self-adjusting lightwave connector for use in conjunction with an electrical connector assembly, said lightwave connector comprising
   first means for terminating a first lightwave cable,
   means for securing said first terminating means to a backplane of said electrical connector assembly and for allowing said first terminating means to move relative to said backplane in a first direction,
   second means for terminating a second lightwave cable,
   means for aligning said first and second terminating means and for allowing said first and second terminating means to move relative to said aligning means in a second direction,
   means for securing said aligning means to a printed wiring circuit board having fingers thereon for mating with said electrical connector assembly and for allowing said aligning means to move relative to said circuit board in a third direction,
   said first, second and third directions being substantially orthogonal to one another.

3. The self-adjusting lightwave connector according to claim 2 wherein said first terminating means comprises a first conical plug having an annular slot, said securing means for said first plug having a ridge for engaging said slot.

4. The self-adjusting lightwave connector according to claim 2 wherein said first terminating means comprises a first conical plug and said second terminating means comprises a second conical plug having
- knurled means at one end to facilitate holding said second plug,
- threads to fasten said second plug into said aligning means, and
- resilient means to allow said second plug to move along said second direction.

5. The self-adjusting lightwave connector according to claim 4 wherein said aligning means comprises
- a biconical center piece for receiving the conical ends of said first and second plugs, the aligning means having
- threads for mating with the threads on said second plug, and
- retaining means for holding said biconical center piece in place within said aligning means.

* * * * *